United States Patent Office 3,371,625
Patented Mar. 5, 1968

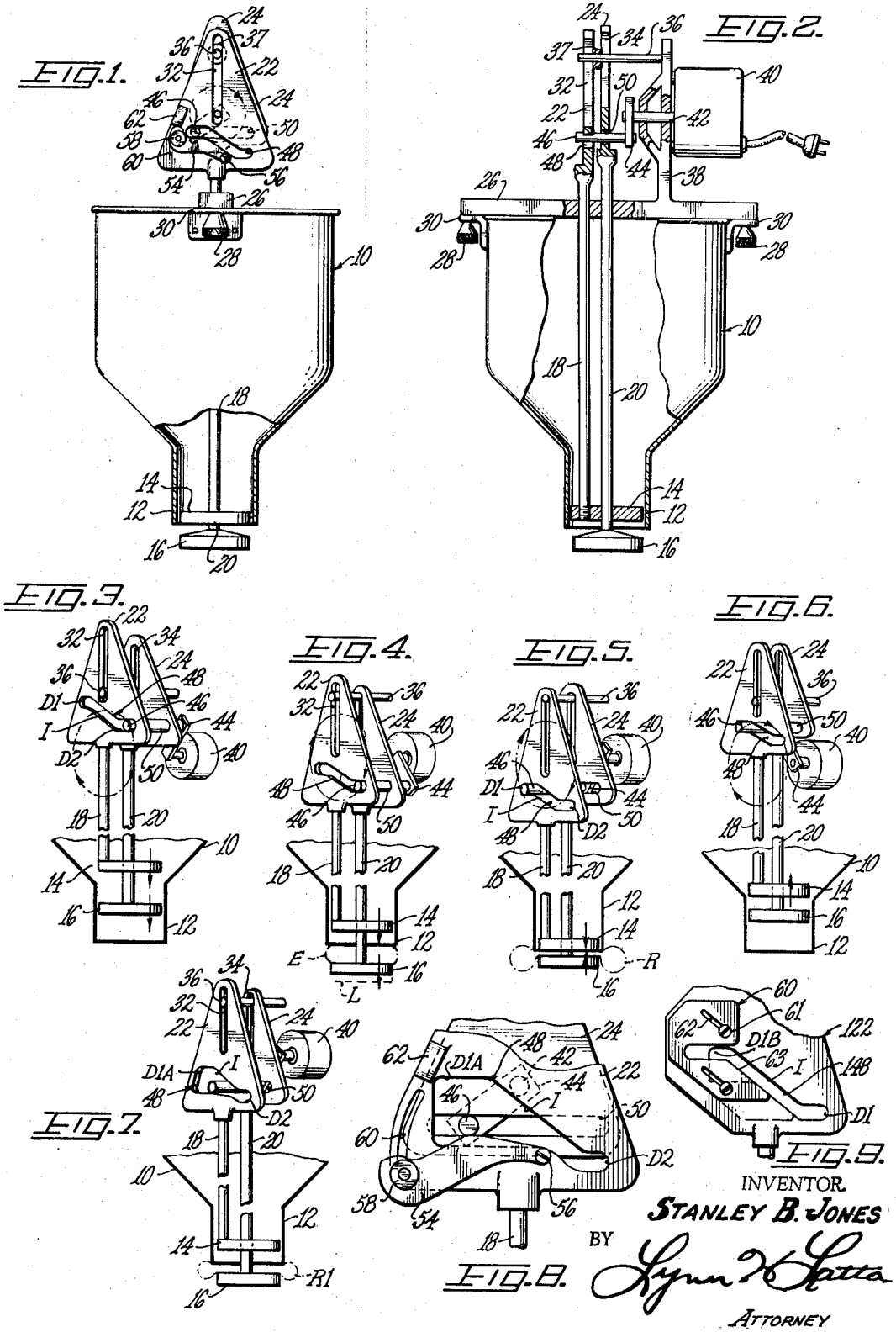

3,371,625
DOUGHNUT DROPPER WITH ADJUSTABLE SIZING MEANS
Stanley B. Jones, Torrance, Calif., assignor to Hol 'N One Donut & Supply Co., Los Angeles, Calif., a corporation of California
Filed July 15, 1966, Ser. No. 565,554
4 Claims. (Cl. 107—14)

ABSTRACT OF THE DISCLOSURE

The invention provides a dough ring former (e.g. "doughnut dropper") having respective dough-ejector and dough ring-cutoff pistons and having dual piston-actuator cams driven by a rotating crank having a single eccentric pin extending through slots in the respective cams, the slots being of such relative configurations as to transmit a relatively short stroke to the ejector piston and a relatively long stroke to the cutoff piston so as to provide opening and closing relative movements between the pistons for drawing dough between them and for extruding such dough into a ring respectively. The configurations of the cam slots are a straight transverse slot for the ejector piston actuator cam and a Z-shape slot for the cutoff piston actuator cam, such Z-slot having an intermediate incline which speeds up the movement of the cutoff piston ahead of that of the ejector piston during second and fourth quarters of the operational cycle, thus attaining the closing and opening relative movements of the pistons through the driving action of a single eccentric pin.

The invention further provides for stroke adjustment of the ejector piston actuator cam so as to vary the stroke of the ejector piston, thus to vary the size of the dough ring that is formed. This is accomplished by modifying the Z-shape of the slot in the ejector piston actuator cam.

The prior art

Doughnut droppers utilizing ejector and cutoff pistons operating on a common axis in a cylindrical throat at the lower end of a dough hopper, in which opening and closing relative movements of the pistons are developed in vertical reciprocations thereof, are well known and commonly used by donut shops in the forming of dough rings which are released to drop into a deep fry vat. Heretofore, the differential stroking of the pistons has been attained by utilizing dual rotating cams of differentiated track configurations, with follower rollers on the ends of respective piston stems or with separate, circumferentially offset eccentric drive rollers engaged in the respective cam tracks to develop the differential strokes of the pistons, as exemplified in the following prior patents: Carpenter, 1,867,307, July 12, 1932; Cottingham, 2,669,949, Feb. 23, 1954.

Such constructions are somewhat complex and expensive, and one of the objects achieved by the present invention is the provision of a simpler and less expensive actuator cam assembly wherein two cams are actuated by a single eccentric drive pin.

Provision for stroke adjustment has been made in the devices disclosed in the Carpenter patent referred to above.

Another object attained by the invention is the provision of a simplified stroke adjustment means which is operable to vary the width of the Z-slot of the ejector piston actuator cam, thereby providing variable lost motion in the response of this cam to the driving action of the driving crank pin.

Other objects will become apparent in the ensuing description of the invention, by reference to the appended drawing, in which:

FIG. 1 is a front elevational view of a dough ring former embodying the invention, with portions thereof broken away and shown in section;

FIG. 2 is a side elevational view of the same, with the central portion thereof broken away and shown in section along the common vertical plane of the axes of the piston stems;

FIG. 3 is a schematic perspective-sectional view of the dough ring forming parts thereof in their positions at the beginning of a cycle, with the actuator mechanism adjusted for a long stroke of the ejector piston;

FIG. 4 is a similarly schematic view of the parts shifted through approximately a quarter cycle;

FIG. 5 is a similarly schematic view of the parts shifted through approximately another cycle;

FIG. 6 is a similarly schematic view of the parts shifted approximately another cycle;

FIG. 7 is a similarly schematic view of the parts at the same cycle positions as in FIG. 5, but with the actuator mechanism adjusted for a short stroke of the ejector piston; and FIG. 8 is a fragmentary face view of an actuator mechanism and its adjustment means; and FIG. 9 is a fragmentary face view of an actuator mechanism embodying a modified form of the invention.

Description

Referring now to the drawing in detail, the invention utilizes a conventional hopper 10 for holding a batch of doughnut dough which feeds downwardly into a cylindrical discharge throat 12, from which it is discharged and formed into a ring by a pair of differentially reciprocating pistons, i.e., an ejector piston 14 and a cutoff piston 16. Pistons 14 and 16 are secured to the lower ends of respective stems 18 and 20 which extend upwardly through the hopper and have respective actuator heads 22, 24 on their upper ends. Stems 18 and 20 are slidably guided in bores in a motor mount bar 26 which bridges diametrically across the rim of hopper 10 and is detachably mounted thereon by conventional attachment bolts with releasable nuts 28 engaging attachment ears 30 secured to opposite sides of hopper 10. Heads 22, 24 have respective medial vertical guide slots 32, 34 which are pierced by a guide finger 36 disposed in the common plane of stems 18, 20, parallel to mount bar 26, and projecting from a motor support post 38 which is anchored to (preferably integral with) the mount bar 26. A spacer washer 37, pierced by guide finger 36, is interposed between cams 22 and 24. A drive motor 40 (i.e. electric) is mounted on the back side of post 38, its shaft 42 projecting through the post 38, and a crank arm 44, secured to the forward end of the shaft, carries an eccentric drive pin 46 which transmits vertically reciprocating movement to the heads 22, 24 for reciprocating the pistons 14, 16. Motor 40 includes suitable reduction gearing such that its crank-drive shaft 42 will rotate relatively slowly (e.g. approximately one revolution per second) suitably for forming dough rings. A suitable on-off switch is associated with motor 40 for starting and stopping its operation.

To develop the differential movements of the pistons 14, 16 the heads 22, 24 are provided with respective cam slots 48, 50 through which the eccentric actuator pin 46 projects, the slots being of differentiated inclination such that the strokes of the pistons are differentiated as to amplitude and as to their time cycles. The slot 50 is a straight horizontal slot, normal to the axis of reciprocatory movements; so that the reciprocation of piston 16 is a harmonic movement. The slot 48 is essentially of Z-shape, as shown schematically in FIGS. 3–6, embodying at its respective ends horizontal dwells D1 (downstroke) and D2 (upstroke) and an intermediate incline I. In general, the vertical distance between the dwells D1, D2 determines the extent of lost motion (closing and opening movements) of the pistons 14, 16 relative to one another, such lost motion being of adjustable amplitude between substantially zero and maximum.

The incline I provides for a stage of relatively rapid descent of piston 14 during substantially a quarter of a cycle occurring between the positions of FIGS. 4 and 5, and a stage of relatively rapid ascent of piston 14 during substantially a quarter of a cycle occurring between the positions of FIGS. 6 and 3.

Stroke adjustment is provided for by a lip 54 (FIG. 8) having an upper margin which defines the lower side of Z-slot 48. Lip 54 at one end is attached by a pivot 56 to the face of cam 22 and at its other end it carries a clamp bolt 58 which extends therethrough and through an arcuate slot 60 in cam 22, concentric with pivot 56, in which the bolt 58, when loosened, can be shifted between a minimum stroke position shown in FIG. 8, and a maximum stroke position shown in FIG. 1. In the latter position the slot 48 is of uniform minimum width from end to end, the pin 46 fits closely in the slot throughout a full cycle, and the cam 22 is driven a full stroke, with maximum amplitude of opening-closing relative movements of pistons 14, 16. In the former position, the slot 48 is widened at its dwell end D1A defined by the downwardly shifted end of lip 54, (see FIG. 7 and FIG. 8) and the cam 22, instead of continuously following the eccentric pin 46 with the latter adjacent the upper margin of its slot 48, follows the pin 46 along the lower margin (which is of lower incline than in the raised position of lip 54) until pin 46 passes and moves slightly beyond the axis of piston stem 18. At this point the pin 46, as it swings upwardly past the lowest point of its orbit, will leave the lower margin of slot 48 and will traverse the widened dwell D1A while movement of piston 14 is arrested, and will then engage the upper margin of dwell D1A, commencing the upward stroke of piston 14. The amplitude of stroke imparted to piston 14, and the opening-closing relative movements of pistons 14, 16, are thus at a minimum.

*Operation*

When motor 40 is operating, eccentric pin 46 is driven in a rotary path clockwise, viewing its forward end (e.g., as in FIGS. 1 and 3–8). The position shown in FIG. 3, in which both pistons 12 and 14 are substantially at their upper stroke limits and commencing to descend, may be regarded as the starting position, beginning a cycle of operation. Such starting positions of both pistons are substantially the same for all adjustments of cam slot 48, since pin 46 operates in its downstroke dwell D2 at the start, and dwell D2 is of minimum width, unaffected by adjustment of lip 54. In the first quarter cycle (movement from FIG. 3 to FIG. 4 position) pistons 14, 16 will move downwardly with uniform spacing (the pin 46 transmitting equal movements to both cams 22, 24, the dwell D2 being aligned with slot 50) and will feed downwardly in throat 12 a charge of dough that has flowed into the space between the pistons during the last quarter of the preceding cycle. At the end of this first quarter-cycle cut-off piston 16 will be approaching its lower limit of stroke (approximately at the position designated L in broken lines in FIG. 4) and an annular dough-extrusion mouth will have opened between piston 16 and throat 12, through which dough will commence to exude as indicated at E. This position is the same for all positions of stroke adjustment of lip 54.

During the second quarter cycle (from FIG. 4 to FIG. 5 position) pin 46, swinging largely horizontally in its lower quadrant) will move out of dwell D2 into incline I and will act against the lower margin thereof to speed up the downward stroke of ejector piston 14, causing it to close toward cutoff piston 16 as the latter commences its upstroke in the middle of this second quarter cycle. At the end of this cycle (FIG. 5) the ejector piston 14 will reach the lower limit of its stroke and cutoff piston 16 will have returned upwardly from its lower limit position to its closest approach to piston 14, extruding the dough into a ring R. The pin 46 will then be at the end of incline I adjacent dwell D1. As it approaches this point, pin 46 will be moving along a segment of its circular path substantially tangent to incline I of the closed slot (FIGS. 1 and 5) and the movement of piston 14 will accordingly be slowed to substantially a stop as piston 16 makes its closest approach at relatively slow speed, having just passed the lower dwell point in its motion (which is sinusoidal due to the fact that slot 50 is a straight transverse slot at right angles to the path of reciprocation and closely fitted to pin 46 without substantial lost motion). With the ejector piston substantially at a standstill and the cutoff piston slowly accelerating in the beginning of its upstroke, the dough ring will be so in relation to the time of the full cycle that better shaping of the ring is provided. A ring of maximum volume is formed where the pistons make closest approach (as in FIG. 5) when slot 48 is adjusted to closed condition as in FIGS. 1 and 5.

Where slot 48 is adjusted to full open position as in FIGS. 7 and 8, the ejector piston 14 does not descend as far, and its lower limit position (FIG. 7) is spaced higher above the cutoff piston 16. Thus less dough is extruded and a smaller ring, indicated at R1 in FIG. 7, is formed. FIG. 7, like FIG. 3, shows the parts at the end of the second quarter cycle.

In the third quarter cycle (movement from FIG. 5 to FIG. 6 positions) pin 46 will operate in the dwell D1 of slot 48 and the pistons will accordingly be moved substantially in unison when slot 48 is adjusted to closed condition as in FIGS. 4 and 5. Since the movement of pin 46 is predominantly vertical in this quarter, the pistons will be raised relatively rapidly. At the beginning of the third quarter cycle the cutoff piston 16 will enter the throat 12, shearing off the dough ring R (or R1) and dropping it into a receptacle (e.g. a deep-fry cooking vat). This will occur at the same point in the cycle for any adjustment of slot 48. At the end of the third quarter, the pin 46 will leave dwell D1 and enter incline I, acting with an amplified camming effect on cam 22 to accelerate the rise of piston 14 away from piston 16, as indicated in FIG. 6.

When slot 48 is adjusted to open position, the upward movement of piston 14 will be delayed while pin 46 effects lost-motion traverse from the lower margin to the upper margin of dwell D1A. The upward movement will then be continued through cam 22. Such continued upward movement will commence no later than the reentry of piston 16 into the throat 12. Since pin 46 will then be operating against horizontal margins of both slots, the upward movement of the two pistons, will be in unison, with fixed spacing between the pistons. The same is true for all other positions of adjustment of lip 54, including the fully closed position of FIG. 1. In each instance, the upward movement of ejector piston 14 will commence before piston 16 enters throat 12, and as long as both pistons are in the throat, the pin 46 will be operating in the dwell D1 of slot 48, so that the pistons will move in unison.

It is important that the pistons move in unison, with fixed spacing when both pistons are in the throat, and that differential movements be executed when one of the pistons is beyond the throat. This avoids compression of the dough in the throat during downstroke, which is especially undesirable in that it would damage the quality of the dough. Also, it avoids creation of a partial vacuum in the throat during upstroke, which would tend to draw air into the chambers between the pistons, thus affecting the accuracy of metering action, and would also affect the smoothness of reciprocating movement of the pistons in the throat and would cause the load on the drive mechanism to become more irregular.

The development of this schedule of piston movements in which the pistons move in unison at all times when both are in the throat, was the major problem encountered in the making of the invention, and was solved by the Z-configuration of slot 48.

In the fourth cycle, the movement of pin 46 being predominantly horizontal, its operation in horizontal slot 50 will slow piston 16 to a stop at the middle of the quarter, while the rapid rise of piston 14 will continue throughout the quarter under the camming action of pin 46 in incline I. Thus the spreading of the pistons will continue, developing a void between the pistons which is filled by dough that is drawn in by the suction thus generated. The spreading of the pistons in the fourth quarter is the same for any adjustment of slot 48, since the upper margin of slot 48 is not changed by the adjustment. Accordingly the suction developed in the fourth quarter cycle is uniform for all positions of adjustment, providing maximum efficiency of recharging of dough into the space between the pistons.

It will now be apparent that by utilizing the Z-slot with horizontal dwells at both ends, the cycle of operation is subdivided into approximately equal quarters in which there is movement of the pistons in unison during alternate quarters of rapid descent and rapid ascent, provided for by operation of the eccentric drive pin in the dwell portions of the slot 48, and differential (closing and opening) movements of the pistons in the intervening quarters when pin 46 is operating in the incline I of slot 48. This has made it possible to utilize the single eccentric pin 46, operating in both slots 48 and 50, to provide the relative movements of the pistons which are effective to draw in a dough charge during upstroke and to eject a dough ring during downstroke of the ejector piston 14.

FIG. 9 illustrates a modified form of the invention wherein the Z-slot 148 is made adjustable by means of a sliding gate 10 mounted on cam 122 by means of a plurality of screws 61 extending through parallel diagonal slots 62 in gate 60 and threaded into cam 122. Slots 62 are parallel to the slot incline I', and gate 60 has an inclined edge 63 which provides a continuation of the lower margin of incline I' in all positions of adjustment. Gate 60 has a horizontal slot at the upper extremity of inclined edge 63, which defines the dwell D1B of slot 148. The slot in cam 122 has a dwell portion at its upper end which is depened vertically as indicated in dotted lines, so that dwell D1B may be open for all positions of adjustment. Gate 60 can be adjusted by loosening screws 61, sliding the gate to a selected position, and then tightening the screws. Other features of cam 122 are the same as in cam 22, as indicated by corresponding reference characters. A second cam, the same as cam 24, is associated with cam 122, for the same type of operation as that described above for FIGS. 1–8.

One of the advantages of the invention is in its adaptability to the operation of a gang of dough-formers for multiple-forming and dropping of doughnut rings. By lengthening the eccentric pin 46 into a rod extending through a plurality of pairs of actuator cams such as the cams 22, 24 or 122, 24, and by providing at its and remote from motor 40 an arm corresponding to crank arm 44 and a trunnion aligned with the shaft of motor 40, journalled in a suitable supporting bearing, the several pairs of cams can be actuated simultaneously.

I claim:
1. A dough ring shaping and dropping machine comprising:
   a dough hopper having a tubular discharge throat;
   an ejector piston vertically slidable in said throat;
   a cutoff piston slidable vertically in said throat below said ejector piston;
   an actuator rotatable about a horizontal axis and having an eccentric drive pin parallel to said axis and orbiting in a circular path therearound;
   said pistons having respective stems extending upwardly and provided with respective cams having respective transverse slots through which said drive pin projects, one of said slots being a substantially straight horizontal slot and the other being of Z-shape, with horizontal dwells at its respective ends in which said pin is engageable to transmit relatively rapid ascending and descending unison movements of said pistons during alternate quarter cycles of operation in which movements of said pin are predominantly vertical, and having an intermediate incline in which said pin is engageable during predominantly horizontal movements of said pin, to develop camming actions against the ejector piston cam to cause the ejector piston to approach the cutoff piston during downstroke and to extrude a dough ring from the lower end of said throat upon separation of said cutoff piston from said lower end, and to effect withdrawal of said ejector piston away from said cutoff piston during upstroke, whereby to create suction in said throat between said pistons for drawing a fresh charge of dough from said hopper into said throat between said pistons upon elevation of said ejector piston above the upper end of said throat.

2. A machine as defined in claim 1, including an adjustment lip defining the lower margin of at least a portion of the incline and of one dwell of said Z-slot, the other dwell being of fixed configuration, said lip, at its end adjacent said other dwell, being pivoted to said ejector piston cam for vertical swinging movements of its other end whereby to vary the depth of said one dwell in a manner to vary the volume of the extruded dough ring.

3. A machine as defined in claim 2, wherein the upper margin of said Z-slot is at all times of fixed configuration, unaffected by adjustment of said lip, whereby the spreading upward movements of said pistons transmitted through said cams are uniform for all positions of adjustment of said lip.

4. A machine as defined in claim 3, wherein said ejector piston cam has therein an arcuate slot extending generally vertically, concentric with the axis of pivotal mounting of said one end of said lip, and wherein the lip has at its said other end a fastener bolt extending through said arcuate slot and operable to secure said lip in any selected position of adjustment.

References Cited

UNITED STATES PATENTS 1,867,307 7/1932 Carpenter.
2,176,989 10/1939 Carpenter.

WALTER A. SCHEEL, *Primary Examiner.*

J. SHEA, *Assistant Examiner.*